United States Patent

[11] 3,609,366

[72] Inventor Robert J. Schwartz
Houston, Tex.
[21] Appl. No. 772,540
[22] Filed Nov. 1, 1968
[45] Patented Sept. 28, 1971
[73] Assignee Schlumberger Technology Corporation
New York, N.Y.

[54] SYSTEMS FOR NEUTRON DECAY TIME WELL LOGGING
34 Claims, 32 Drawing Figs.

[52] U.S. Cl. .................................................. 250/83.3, 250/71.5
[51] Int. Cl. .................................................... G01r 5/00
[50] Field of Search ........................................ 250/83.3, 83.6 W, 71.5

[56] References Cited
UNITED STATES PATENTS
2,956,165 10/1960 Johnson ........................ 250/83.6 W
3,420,998 1/1969 Mills, Jr. ........................ 250/83.6 W X
3,435,224 3/1969 Zemanek, Jr. ................. 250/83.6 W

Primary Examiner—Achie R. Borchelt
Attorneys—Ernest R. Archambeau, Jr., John P. Sinnott, Stewart F. Moore, David L. Moseley, Edward J. Roney, William R. Sherman, William J. Beard and Stewart F. Moore

ABSTRACT: In accordance with an illustrative embodiment of the present invention, a well-logging exploring device includes a pulsed neutron source which is repetitively energized to irradiate a formation with neutrons and means for generating a sync pulse representative of the time of termination of such irradiation. In response to this irradiation, a nearby scintillation counter generates signal pulses at a rate representative of the neutron population in the media surrounding the exploring device. The sync and signal pulses are then transmitted to the surface of the earth. At the surface of the earth, signal-processing circuits operate to accurately distinguish the sync and signal pulses and resolve any signal pulses which may have become merged due to the relatively low frequency response of the cable. These resolved signal pulses are then applied to computing circuits which operate to determine the rate of decay of the neutron population in the formation by determining the rate of change of the signal pulse repetition rate. In this connection, the signal pulses are weighted and then gated to a binary counter during a cycle of adjustable time intervals. By appropriately selecting the relationship of the time intervals to one another and the factors by which the signal pulses are weighted during each time interval, the accumulated count in the counter after each cycle of time intervals will be representative of the rate of decay of the neutron population and is used to determine the time intervals. The sync pulses synchronize the surface electronics with the repetitive irradiation of the formation with neutrons.

SYSTEMS FOR NEUTRON DECAY TIME WELL LOGGING

This invention relates to new and improved methods and apparatus for investigating earth formations adjacent a borehole and for processing the well-logging data derived from such formation investigating apparatus.

One procedure for determining the character of formations comprises irradiating a formation with neutrons for a selected period of time and then determining the concentration of thermal neutrons in the formation at selected times after irradiation so that a neutron characteristic time constant of the formation may be ascertained. Because the various elements in a formation capture thermal neutrons at different rates, the change of thermal neutron concentration with time following irradiation will be different for different materials. Thus, the determination of this rate of capture can be used to give an indication of the type of materials present in any given formation. Usually, this neutron characteristic is expressed as the thermal neutron decay time, which is the time required for the thermal neutron concentration to decrease by a factor equal to $1/e$ of its initial concentration (where $e = 2.718$, the Naperian logarithm base).

When the earth formation material adjacent a borehole is being analyzed, the variation of neutron concentration with time during the period immediately following irradiation is influenced to a large extent by material in the borehole. As the thermal neutron intensity reaches a low level, measurements are altered by a background and noise effect arising primarily from the natural radioactivity content of the formation and particularly from activation of some of the elements in the formation. Thus, to determine this rate of decay of thermal neutrons, the measurements should desirably be made at a time after the borehole influence on the measurements has passed and before the background effect becomes important. Consequently, there is only a limited period of time during which the neutron characteristic time constant of a formation can be determined accurately. To further complicate matters, this characteristic time constant varies widely for different formation materials and thus measurements taken during one time interval when one type of formation material is being investigated will not produce accurate results for another type of formation material due to possible errors caused from either the borehole effect or the background effect on the measurements.

One way of measuring the characteristic time constant, such as the thermal neutron decay time, of a formation material without incurring the above described difficulties is set forth in copending application Ser. No. 592,795 now U.S. Pat. No. 3,566,116 filed by William B. Nelligan on Nov. 8, 1966. In this copending Nelligan application, a pulse source generates a burst of high energy (14 MEV) neutrons which enter the borehole and surrounding formation undergoing collisions and losing energy until these neutrons are in thermal equilibrium (neither gaining nor losing energy) with their environment, i.e., they are thermal neutrons. When the neutrons are at or near thermal energy, they are captured by elements in the formation or borehole and the capturing elements emit gamma rays as a consequence of the capture process. A nearby scintillation detector measures these emitted gamma rays and generates a series of pulses at a rate dependent on the emitted gamma rays which reach the crystal of the scintillation detector. The counting rate from the scintillation detector is therefore a measure of the density of thermal neutrons present at any particular time. Since the neutron source is pulsed, i.e., turned on for a brief period of time and then turned off, the neutron population developed by the source will diminish with time as the thermal neutrons are captured by elements of the formation. This decay of thermal neutrons is exponential and the time for the neutron population to decrease by a factor of $1/e$ is called the decay time, $\tau$.

The Nelligan system operates to calculate this decay time $\tau$ by counting the pulses in two separate time intervals, which time intervals are functions of $\tau$. By so doing, the ratio of the counts measured during one time interval to the counts measured during the other time interval will always be constant if $\tau$ has been accurately computed. The ratio of the counts during these two time intervals is then used to adjust the frequency of an oscillator to maintain the ratio of the counts during the two intervals substantially constant at a selected value. By so doing, the period of the oscillator signal will also be a function of the decay time, $\tau$.

This operation is accomplished in the Nelligan system by individually accumulating the counts occurring during the two timing intervals in separate counters and reading out the count accumulated in a first counter when the count accumulated in a second counter has reached a fixed level. The count accumulated by the first counter is then used to adjust the frequency of the control oscillator and to provide indications of $\tau$.

While this Nelligan system operates satisfactorily, it would be desirable to provide certain improvements over the Nelligan system.

It is one object of the present invention therefore, to provide new and improved methods and apparatus for use in the investigation of earth formations traversed by a borehole and, more particularly, for use in the processing of data derived from exploring devices utilized in the investigation of earth formations.

It is a further object of the present invention to provide certain improvements over the methods and apparatus set forth in the copending Nelligan application.

In accordance with the present invention, well-logging methods and apparatus comprise irradiating a formation with neutrons and generating a plurality of pulses which vary with time as a function of the formation neutron population where at least part of the pulses arise as a result of the irradiation. At least a portion of the pulses generated during a first time interval after irradiation are added by a digital-counting means and at least a portion of the pulses generated during a second time interval after irradiation subtracted from the first time interval pulses in the digital-counting means. In a desirable form of the invention, the digital-counting means is made to subtract the second time interval pulses from the first time interval pulses by complementing the contents of the counting means before and after the second time interval.

By properly selecting the relationship of the first and second time intervals to one another and the ratio of generated pulses which can be counted by the counting means during the two time intervals, the first and second time intervals can be adjusted to produce an equilibrium condition where the accumulated count in the counting means after each cycle of operation (i.e., after the last measurement time interval) remains constant on the average for any given rate of decay of the formation neutron population. The accumulated count in the counting means after each cycle of operation is used to generate a control signal having a period representative of this accumulated count to energize suitable gating means for passing the generated pulses during the first and second time intervals. These gated pulses are then weighted in accordance with the aforesaid selected ratio for application to the counting means. By this arrangement, the first and second time intervals will be varied to maintain this selected ratio constant so that the period of the control signal will be proportional to the rate of decay of the formation neutron population.

Generally, in another form of the present invention, this arrangement could be utilized to determine the rate of decay of any well-logging signal having a decay rate representative of a formation characteristic which is to be determined.

In another form of the present invention, the signal strength of well-logging signals can be automatically adjusted for normalizing the well-logging signals. To accomplish this, selected portions of the well-logging signals are sampled to enable the generation of a gain control signal in response to the signal strength of the sampled signals. This gain control signal is then used to adjust the signal strength of all of the well-logging signals. This form of the invention is especially suitable when used with that type of well-logging exploring device which emits energy into a formation and generates a signal representative of the formation reaction or response to the energy and also generates a sync pulse representative of the time at which the energy was emitted. The sync pulse, which can readily be separated from the reaction signal, is sampled, after gain adjustment, and its amplitude is measured. This measured amplitude is then compared with a reference amplitude and the difference therebetween used to adjust the gain adjustment means so as to maintain the measured amplitude and reference amplitude substantially the same.

For a better understanding of the present invention, together with other and further objects thereof, reference is had to the following description taken in connection with the accompanying drawings, the scope of the invention being pointed out in the appended claims.

Referring to the drawings.

Figure 1:
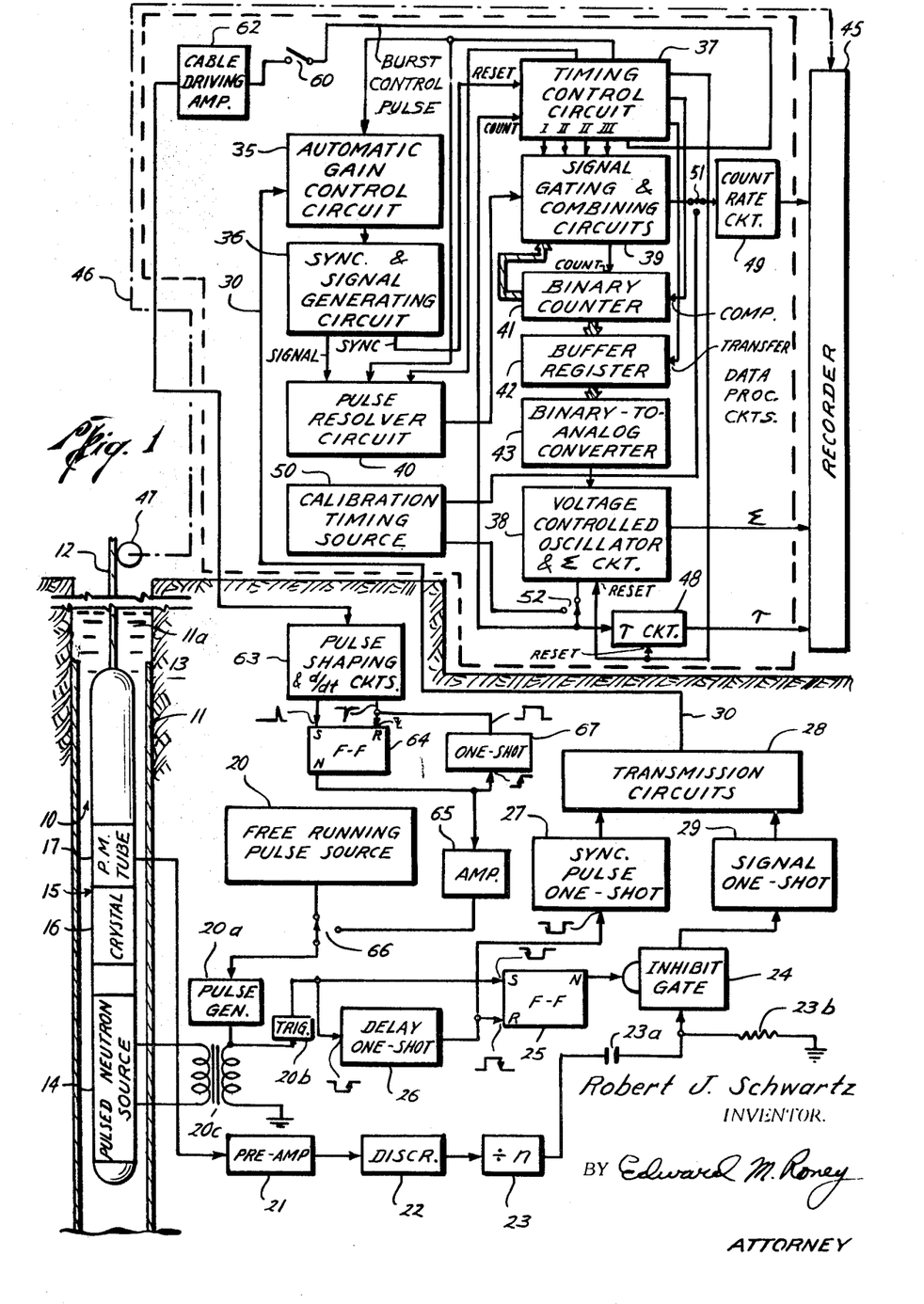
FIG. 1 shows an exploring device in a borehole along with a schematic representation of circuitry for energizing the exploring means and processing the resulting well-logging signals in accordance with the present invention.

Now referring to FIG. 1, there is shown an exploring device 10 lowered in a cased borehole 11 on the end of an armored cable 12 for investigating subsurface earth formations 13. (In FIG. 1, the borehole 11 is shown cased but could also be uncased as concerns the present invention.) The exploring device 10 includes a pulsed neutron source 14 which is adapted to generate high energy neutrons when pulsed. A nearby scintillation detector 15 comprising a suitable crystal 16 and photomultiplier tube 17 is responsive to the gamma rays emitted from the capture of thermal neutrons by the elements in the borehole, including the borehole casing, and the elements in the formation for generating pulses at a rate representative of the emitted gamma rays. As an alternative, neutron-sensitive detectors could be used. In this event, cancellation of the background counts would not be necessary.

Concerning the downhole circuitry associated with the pulsed neutron source 14 and scintillation detector 15, a free running pulse source 20 energizes a pulse generator 20a which supplies an ion source pulse having a fixed amplitude level and time period (shown in FIG. 2A) to a transformer 20c for application to the pulsed neutron source 14 for irradiating the borehole and formation with high energy neutrons. (Alternatively, the AC-power signal (not shown) supplied from the surface of the earth could be used as a timing source.) The resulting pulses from the photomultiplier tube 17 are applied to a preamplifier 21, a discriminator 22 which only passes those pulses above a predetermined amplitude level, and a divide-by-N counter 23. The particular value of N for the divide-by-N counter 23 is selected in accordance with the maximum permissible transmission rate over the cable 12 to the surface of the earth. A differentiator circuit comprising a capacitor 23a and an resistor 23b differentiates the square wave output signal from counter 23 for application to an inhibit gate 24. By differentiating this square wave signal before application to inhibit gate 24, the switching of gate 24 will not produce erroneous pulses.

Immediately after a neutron burst is generated from the pulsed neutron source 14, there will be a high incidence of thermal neutrons being captured by the casing and borehole constituents of the cased borehole 11 and thus the rate of pulses from the scintillation detector 15 will be extremely high at this point in time. If these initial pulses were allowed to be transmitted to the surface of the earth, they would tend to exceed the transmission capability of the cable. Also, as will be explained later, such a large rate of pulses may tend to adversely affect some of the signal-processing circuitry in the surface electronics.

Figure 2A:
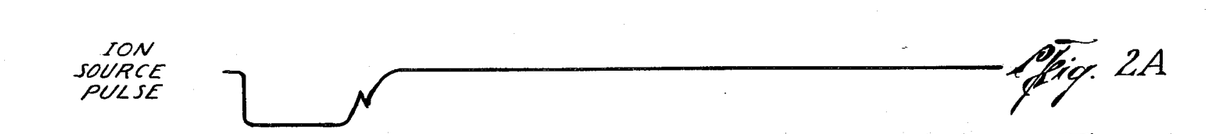
FIGS. 2A–2H represent voltage-timing diagrams useful in explaining the operation of the downhole circuitry of FIG. 1.
Figure 2B:
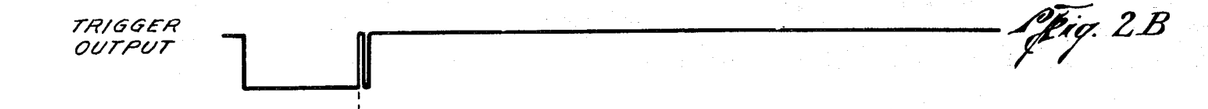
Figures 2C, 2D:
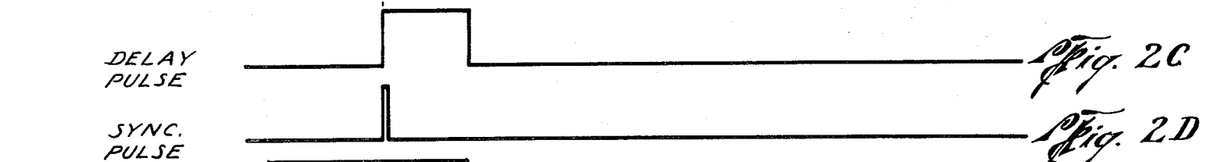

Thus, to prevent these undesirable affects, referring to FIGS. 1 and 2A–2H in conjunction, the ion source pulse shown in FIG. 2A is shaped by a trigger 20b (e.g., a Schmitt trigger) to produce the shaped pulse of FIG. 2B whose leading edge sets a gate control flip-flop 25. The output pulse from flip-flop 25, shown in FIG. 2E, energizes the inhibit gate 24 so as to prevent the detected pulses from discriminator 22, shown in FIG. 2F, from being passed through inhibit gate 24 (after scaling by the divide-by-N circuit 23). To open the inhibit gate 24 (by resetting flip-flop 25), the trailing edge of the triggered ion source pulse of FIG. 2B triggers a delay one-shot 26 whose output pulse is shown in FIG. 2C. The trailing edge of the delay pulse of FIG. 2B resets the gate control flip-flop 25 to enable passage of the scaled signal pulses.

To provide an indication at the surface of the earth of the time of termination of irradiation of the formations with neutrons, the leading edge of the output pulse from delay one-shot 26 energizes a sync pulse one-shot 27 which generates the sync pulse of FIG. 2D for transmission to the surface of the earth by way of suitable transmission circuits 28. The delay pulse of FIG. 2B is used to generate the sync pulse instead of the ion source pulse because of amplitude fluctuations which ordinarily appear on the trailing edge of the ion source pulse, as shown in FIG. 2A. This fluctuation arises from ringing of the transformer 20c with its associated capacitance and a capacitor (not shown) in pulse generator 20a. As seen in FIG. 2B, the trigger circuit 20b may be turned on and off twice for each ion source pulse. Thus, by utilizing the leading edge of the delay pulse of FIG. 2C to generate each sync pulse, it is insured that only one sync pulse will be generated per ion source pulse.

Figure 2E:
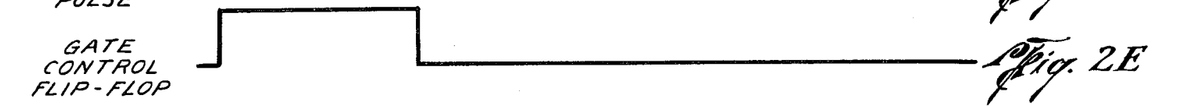
Figure 2F:
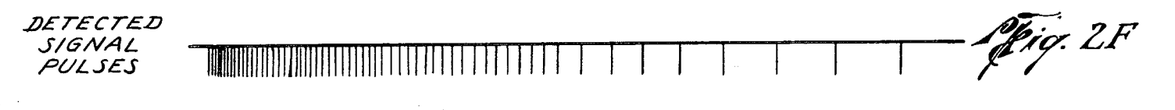
Figures 2G, 2H:
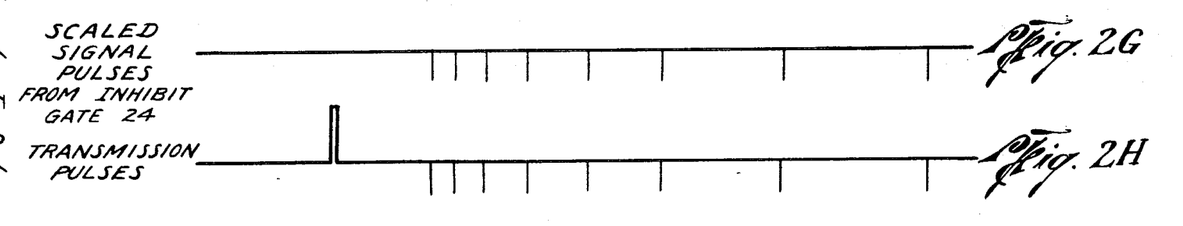

The scaled and differentiated signal pulses from inhibit gate 24, energize a "signal one-shot" 29 so as to generate the scaled signal pulses of FIG. 2G for application to the transmission circuits 28 to be transmitted to the surface of the earth in opposite polarity to the sync pulses. The resulting transmission pulses applied to the cable 12 are represented in FIG. 2H. It can be seen that the downhole circuit operation separates the sync pulse from the signal pulses by a sufficient time interval to prevent interference of the sync and signal pulses with one another. As will be explained later, this provides important advantages in connection with the operation of the surface electronics.

Now referring to the circuitry at the surface of the earth, the sync and signal pulses transmitted by the cable 12 are applied to the input of an automatic gain control circuit 35 by way of a cable conductor 30. (The reference ground conductor is not shown.) The automatic gain control circuit 35 operates to normalize both the sync and signal pulses. To accomplish this, the automatic gain control circuit 35 utilizes only the sync pulse to determine the amount of gain regulation that is necessary. A signal derived from a timing control circuit 37 aids the automatic gain control circuit 35 in determining which ones of the transmitted pulses are sync pulses.

The gain-adjusted sync and signal pulses are then applied to a sync and signal generating circuit 36 which operates to accurately separate the sync and signal pulses from one another and additionally has provisions for generating a synthetic sync pulse if a sync pulse is not received from the downhole equipment within a given period of time. The resulting sync pulse is utilized to reset various circuits contained in the surface electronics and thus to synchronize the surface electronics with the downhole electronics.

The detected signal pulses are passed to a pulse resolver circuit 40 which operates to resolve signal pulses which are so closely spaced as to become merged into one composite pulse. The pulse resolver circuit 40 performs this function by generating a synthetic pulse having a time duration slightly greater than the time duration of a single, unmerged signal pulse received from the cable 12. By comparing the duration of the received signal pulse and the synthetic pulse, it can be determined whether one or two signal pulses has been received at the surface of the earth. The pulse resolver circuit 40 also operates to adjust the duration of this synthetic pulse so as to always have a given relationship to a single, unmerged signal pulse. To prevent the pulse resolver circuit 40 from determining the time duration of these synthetic pulses when there is a high probability of receiving a large number of merged pulses, this time duration adjustment operation is inhibited in response to signals from the timing control circuit 37 during certain time intervals when there is a high probability of merged pulses being received.

Before proceeding with the discussion of how the surface circuitry of FIG. 1 operates to accurately determine the thermal decay time $\tau$, it would first be desirable to briefly discuss the parameters that the present system measures. As previously stated, the downhole portion of the FIG. 1 system operates to emit a burst of neutrons into the media surrounding the exploring device 10. After the neutron burst is turned off, the neutron population $N$ at any time, $t$, is:

$$N = N_0 I^{-\nu \Sigma t} \quad (1)$$

where $\nu$ is the velocity of a thermal neutron, $\Sigma$ is the macroscopic cross section of the surrounding media, i.e., the relative probability of capture by the elements of the surrounding media, $N_o$ is the neutrons at the time $t_o$ that the neutron burst is turned off, and $t$ is time measured from time $t_o$. Since the velocity of a thermal neutron at room temperature is 220,000 cm./sec., equation (1) can be rewritten as:

$$N = N_0 I^{-\left(\frac{t}{4.55} \times \frac{10^{-6}}{\Sigma}\right)} \quad (2)$$

If the substitution $$\tau = \frac{4.55 \times 10^{-6}}{\Sigma}$$

seconds is made, equation (2) can be rewritten as:

$$N = N_0 I^{-t/\tau} \quad (3)$$

is then the decay time constant and is inversely proportional to the macroscopic cross section $\Sigma$.

Figures 3A, 3B:
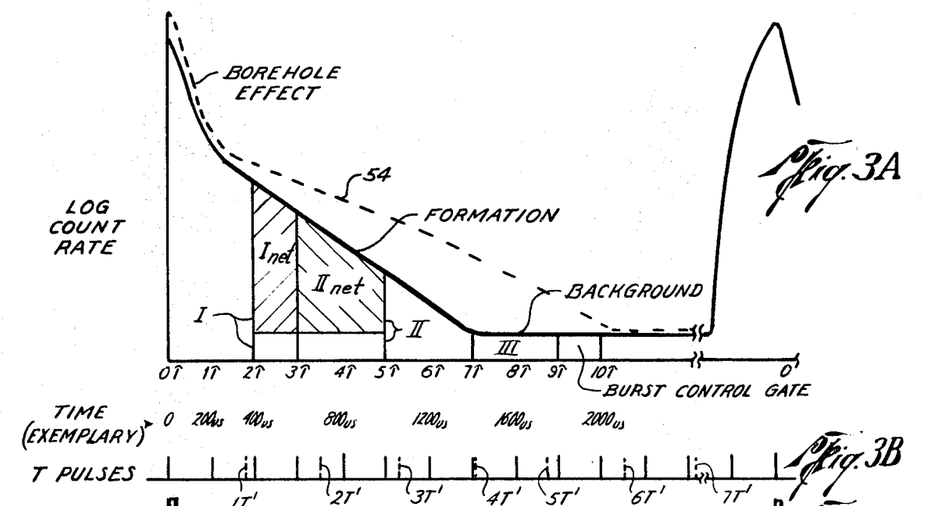
FIG. 3A represents a plot of the logarithm of the rate of pulses generated from the downhole-exploring device versus time for purposes of explaining the theory of operation of the FIG. 1 apparatus.
FIGS. 3B–3J represent the voltage waveforms found at various points in the FIG. 1 circuitry, FIGS. 3B–3J being correlated in time with the graph of FIG. 3A.

Now referring to FIG. 3A, there is shown a plot of the logarithm of the count rate of the signal pulses from detector 14 versus the decay time T. It can be seen from FIG. 3A that the count rate drops off very quickly at first due to the borehole effect before assuming a substantially constant rate of change and then leveling off to a substantially constant count rate level. The intermediate portion of the FIG. 3A curve corresponds to the rate of decay of the neutron population in the formation and the last portion of the FIG. 3A curve represents the background count rate due to the natural radioactive content of the formation and the oxygen activation by neutrons. (This activation arises from oxygen atoms absorbing neutrons to become nitrogen-16 which then emits gamma rays and decays with a half-life of 7.4 seconds.) It is to be noted that the formation decay rate is actually exponential but when plotted as a logarithmic function of count rate assumes a constant slope.

The measurement operation of the present invention is based on the fact that this decay due to the capture of thermal neutrons by the formation will always be exponential with the decay time T varying in dependence on the makeup of the formation. (Recall that $\tau$ is the time for the neutron population, and thus the count rate, to decay by a factor of $1/e$.) To measure the decay rate characteristic of the formation, it is only necessary to sample the intermediate or formation portion of the curve of FIG. 3A at two points. However, due to statistics, it is desirable to sample the count rate characteristic of the formation during two separate time intervals which time intervals should be as great as possible.

Thus, in FIG. 3A, pulses are accumulated during a first time interval from $2\tau$ to $3\tau$ to give a total accumulated count designated I and pulses are accumulated during a second time interval between $3\tau$ and $5\tau$ to give a total accumulated count designated II. (The total accumulated counts during time intervals I and II correspond to the areas I and II under the curve of FIG. 3A.) Since the rate of decay arising only from the capture of thermal neutrons in the formations is desired, the pulses generated during a third time interval $7\tau$ to $9\tau$ are accumulated to produce a measure of the accumulated count, designated III, due to background and activation. To provide a measure of the accumulated pulses or counts during time intervals I and II due to neutron irradiation only, the background count rate is subtracted from the measured count rate during time intervals I and II to leave the cross hatched areas $I_{net}$ and $II_{net}$. $I_{net}$ and $II_{net}$ then represent the accumulated counts due to neutron irradiation only.

Thus, the equations for $I_{net}$ and $II_{net}$ are:

$$I - (III/2) = I_{net} \quad (4)$$
$$II - III = II_{net} \quad (5)$$

(III/2 because interval I is half the time span of interval II and III). It is known that if gate 1 is $1\tau$ wide and gate 2 is $2\tau$ wide with gate 2 commencing upon the termination of gate 1, the ratio of $I_{net}$ to $II_{net}$ is $$(I_{net}/II_{net}) = 2 \quad (6)$$

Substituting equations (4) and (5) into equation (6), we have $$I - \frac{III}{2} - 2II + 2III = I - 2II + \frac{3}{2}III = n \quad (7)$$

where $n=0$ if gate 1 is $1\tau$ wide and gate 2 is $2\tau$ wide, which is the condition of equilibrium. To simplify the operation of the FIG. 1 apparatus, both sides of equation (4) are divided by two so that the scale factors for time intervals I, II and III are all less than 1. Thus, $$\frac{I}{2} - II + \frac{3}{4}III = n \quad (8)$$

Equation (8) gives the mode of operation of the FIG. 1 apparatus and signifies that for the case of time interval I being $1\tau$ wide, time II being $2\tau$ wide and time interval III being $2\tau$ wide with time interval II commencing upon the termination of time interval I, if all of the counts or signal pulses received during time interval II are subtracted from half the counts received during time interval I and three-fourths of the counts received during time interval II, then the time intervals I, II and III are accurately proportional to the neutron decay time $\tau$ if a total of zero counts is accumulated. Of course, equation (8) can be appropriately changed by setting up different operating conditions (i.e., different relationships of the time intervals to one another) without departing from the scope of this invention.

Figure 3C:
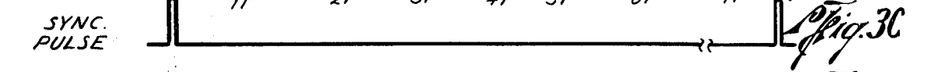
Figure 3D:
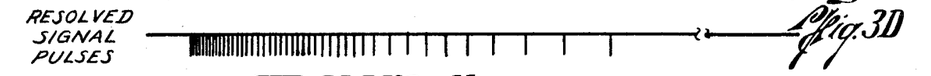
Figure 3E:
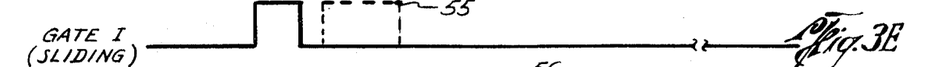
Figure 3F:
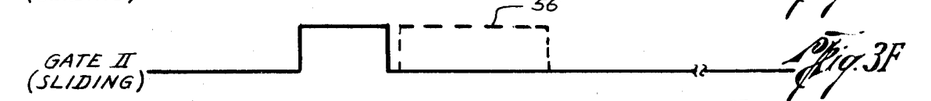
Figure 3G:
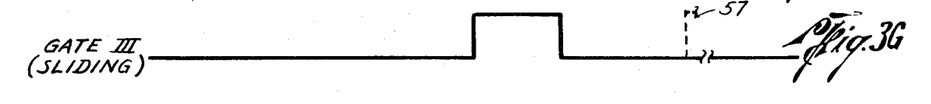

Referring back to FIG. 1, a voltage-controlled oscillator 38 generates the T pulses shown in FIG. 3B which cause the timing control circuit 37 to generate the gating time interval I, II and III control pulses shown in FIGS. 3E, 3F and 3G respectively. Thus, it can be seen that if $n=0$, then $T=\tau$ and the period $T$ of oscillator 38 can be measured to provide an indication of the formation decay time, $\tau$. The sync pulse of FIG. 3C is utilized to reset the timing control circuit 37 to its initial ($0\tau$) time position, as seen by comparing FIGS. 3A, 3B and 3C. The signal pulses of FIG. 3D from the pulse-resolver circuit 40 are then applied to the signal-gating and combining circuits 39 which operate to gate out the signal pulses at the proper time and with the proper scale factors or weights, i.e., 1/2 I, II and 3/4 III.

Figure 3H:
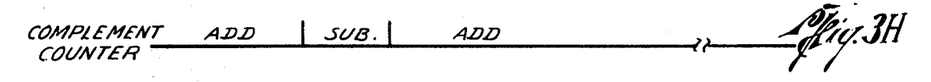

The gated and scaled signal pulses are then applied to a binary counter 41 which operates to perform the accumulation operation depicted in equation (8) for each cycle of operation. (A cycle of operation is the system operation from one irradiation to the next.) Thus, the counter 41 adds or subtracts the new value of $n$ for each cycle to or from the previously stored value. To produce the polarity inversion (subtraction) represented in equation (8), the timing-control circuit 37 generates complement pulses at the beginning and end of the gate II time interval, as represented in FIG. 3H. Thus, the binary counter 41 will count up during time interval I. Then, at the beginning of time interval II, the data accumulated in binary counter 41 is complemented, i.e., every 1 is converted to a 0 and every 0 is converted to a 1, and the counter continues to count up during the time interval II. Thus, due to this complementing operation, the count accumulated by the counter 41 will be converted to a negative number and the pulses counted during time interval II will, in effect, be added to this negative number.

At the end of time interval II, the counter is again complemented by the second complementing pulse in FIG. 3H and then proceeds to count three-fourths the pulses received during time interval III. Thus, in effect, the pulses generated from signal gating and combining circuits 39 during time intervals II are subtracted from those generated from circuits 39 during time intervals I and III. This is the operation depicted in equation (8). By this complementing operation, the counter will always be counting in the same direction whether the operation is addition or subtraction. This add-subtract operation can then be accomplished without the usual delay inherent in binary up-down counters.

Figure 3I:
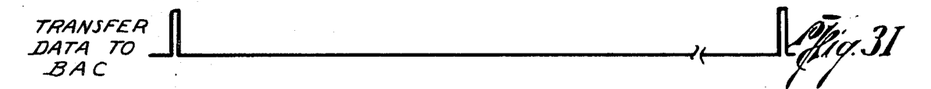

The count held by binary counter 41 is stored by a buffer register 42 which applies this count to a suitable binary-to-analog converter 43 upon receiving a transfer command from the timing control circuit 37. This transfer command is shown in FIG. 3I and occurs at the same time as the sync pulse of FIG. 3C. The output of the binary-to-analog converter 43 is thus an analog voltage which is proportional to the macroscopic cross section $\Sigma$ and thus the frequency which the voltage controlled oscillator 38 should be operating at. Thus, the voltage is utilized to control the voltage controlled oscillator 38 to generate pulses having a period $T$ (i.e., the time interval between pulses) exactly equal to the decay time $\tau$. Thus, these pulses will be called $T$ pulses.

The voltage-controlled oscillator circuit 38 also generates an output signal proportional to the macroscopic cross section $\Sigma$ since the frequency of the T pulses is proportional to $\Sigma$. If desired, the output voltage from the binary-to-analog converter 43 could be utilized as a measure of $\Sigma$. However, if the voltage-controlled oscillator 38 takes the form of a sawtooth wave generator, e.g., a PNP transistor connected to provide a current which is constant for any given value of output voltage from the binary-to-analog converter 43 to a capacitor where the voltage on the capacitor is monitored to enable reset thereof when this capacitor voltage reaches a predetermined value, the emitter current will more accurately reflex $\Sigma$. The reason for this concerns an offset desirably used in the oscillator circuit 38 to produce an accurate frequency for given voltage values from the binary-to-analog converter 43.

The T pulses from the voltage controlled oscillator 38 are applied to a $\tau$ circuit 48 which operates to compute the value of $\tau$ by measuring the peak voltage of a sawtooth wave having a constant slope but with a period equal to the decay time $\tau$. Since the slope is constant, the peak voltage of the sawtooth wave will be proportional to the period of the T pulses, and thus proportional to the decay time $\tau$ of $T=\tau$. This $\tau$ signal as well as the $\Sigma$ signal from oscillator and $\Sigma$ circuit 38 are applied to a suitable recorder 45 which is driven as a function of depth by a shaft 46 coupled to a rotating wheel 47 engaged with the cable 12.

The T pulses generated from the voltage-controlled oscillator and $\Sigma$ circuit 38 are then supplied to the timing control circuit 37 as timing pulses. The timing control circuit 37 operates to count these T pulses to generate the gate I, gate II, gate III timing signals of FIGS. 3E, 3F and 3G, the complement pulses of FIG. 3H, as well as the burst control pulses of FIG. 3J whose function will be explained later. Moreover, the timing control circuits 37 operate to check the sync pulse for veracity and then pass the resulting verified or authenticated sync pulse to the oscillator 38 and $\tau$ circuit 48 to synchronize these circuits, as well as to the buffer register 42 as the transfer pulse of FIG. 3I.

In addition to recording indications of $\tau$ and $\Sigma$, the counts or pulses received by the surface electronics during gating time intervals I or III can also be recorded. To accomplish this, the signal and combining circuit 39 is adapted to readout the signal pulses received during either the gate I or III time intervals to a count rate circuit 49 which converts the pulse rate to a DC signal proportional thereto for recording by the recorder 45. This information is beneficial in setting the sensitivity of the detector 15 and in interpreting the results of the curves recorded by the recorder 45 (the reliability (statistics) of the curves are a function of the count rate).

To provide a means for calibrating the surface electronics circuit of FIG. 1, a calibration timing source 50 is adapted to supply a signal having a selectable magnitude and frequency to the count rate circuit 49 by way of a multiple double-throw switch 51. Additionally, the calibration timing source 50 is adapted to supply pulses having an accurate amplitude and frequency to the circuits driven by the output of the voltage-controlled oscillator 38 by way of a double-throw switch 52. These simulated pulses take the place of the pulses generated from the voltage-controlled oscillator 38 for purposes of calibration.

Summarizing the operation of the FIG. 1 apparatus and referring to FIGS. 1 and 3A-3I in conjunction, the free running pulse source 20 repetitively energizes the neutron source 14 to irradiate the adjoining media with neutrons and the detector 15 generates a train of pulses after each irradiation having a pulse rate proportional to the neutron population in the surrounding media. The sync pulses (See FIG. 2D) are generated to provide an indication at the surface of the earth of the time of the end of the irradiation. The composite train of sync and signal pulses (See FIG. 2H) are processed by the automatic gain-control circuit 35, sync and signal-generating circuit 36, and pulse resolver circuit 40 to produce individual sync and signal pulses.

Each sync pulse of FIG. 3C from the sync and signal-generating circuit 36 is checked for authenticity by the timing control circuit 37, and if authentic, resets the timing control circuit 37 to its initial (0$\tau$) state. This can be seen by comparing FIGS. 3A and 3C. Then the pulses from the voltage controlled oscillator and $\Sigma$ circuit 38 are counted by the timing control circuit 37 to produce the gating time intervals I, II and III shown in FIGS. 3E, 3F and 3G. The signal gating and combining circuit 39 weights or scales the signal pulses from the pulse-resolver circuit 40 during the gate timing intervals I, II and III in accordance with the scale factors of equation (8). The scaled signal pulses are counted by the binary counter 41 with the complementing pulses of FIG. 3H providing the polarity factors of equation (8). Then, the data transfer pulse of FIG. 3I transfers the contents of the buffer register 42 to the binary-to-analog converter 43 to provide voltage substantially proportional to the accumulated count of the counter 41 for controlling the frequency of the voltage-controlled oscillator 38. It should be noted here that the counter 41 is not reset at any time during a logging run through a borehole. Thus, the contents of counter 41 is $$\int_0^x n dx$$

where $x$ is the number of past cycles of operation.

Thus, it can be seen that the binary counter 41 operates as a digital integrator in response to the error signal $n$ comprising the net change in the number stored in the binary counter 41 at the end of each cycle of operation. This error signal $n$, then is equal to the left-hand side of equation (8). (It is an error signal since the period of the T pulses is only equal to T if the system is in equilibrium. If the left-hand side of equation (8) is not equal to zero, the system is not in equilibrium.) Thus, so long as the voltage-controlled oscillator 38 is operating at a frequency which will satisfy the equilibrium condition of equation (8), there will be no set change in the count stored in binary counter 41 from one cycle of operation to the next.

However, if the formation $\tau$ should change, the left-hand side of equation (8) will no longer equal zero and thus the accumulated count in the binary counter 41 will change correspondingly at the end of each cycle of operation to cause the voltage-controlled oscillator 38 to change frequency until the equilibrium condition of equation (8) is again established. When this happens, the period of the T pulses being generated from the voltage-controlled oscillator 38 will be equal to the new value of $\tau$. It should be noted that the response time of the system is desirably set so that a lag time of several cycles of operation is required for the system to adjust to a new value of $\tau$. This can be accomplished by minimizing the net change by the counter 41 relative to a change in $\tau$. By so doing, noise will not cause wild fluctuations in the recorded value of $\tau$ and there will be some allowance for statistical variations.

Referring to FIGS. 3A–3G for an example of this operation, assume that $\tau$ has changed to give the dashed-line curve 54 of FIG. 3A. To satisfy equation (8), the frequency of the T pulses of FIG. 3B must decrease as represented by the dashed-lined pulses of FIG. 3B. The T times corresponding to this new situation are designated 1T', 2T', 3T', etc. in FIG. 3B. Since the frequency of the T pulses will decrease, the operation of the timing control circuit 37 will also slow down. The gate I pulse 55 of FIG. 3E corresponding to the curve 54 of FIG. 3A will be opened or initiated in response to the 2T' pulse and terminated in response to the 3T' pulse. In like fashion, the gates II and III control pulses 56 and 57 of FIGS. 3F and 3G corresponding to this new situation will be initiated by the 3T' and 7T' pulses respectively and terminated by the 5T' and 9T' pulses respectively.

This operation could perhaps be better envisioned by visualizing the T pulses of FIG. 3B and thus the gate I, II, and III locations as being positioned on a rubberband which is adapted to expand or contract. The rubberband will be expanded or contracted in response to the slope of the count rate curve of FIG. 3A. The exact expansion or contraction of this rubberband will be such as to bring the T pulses to a position that the net change in state of the binary counter 41 after each cycle of operation will be zero, i.e., equation (8) will be satisfied. Thus, for the solid-line curve of FIG. 3A, the rubberband will be contracted and for the dashed-line curve of FIG. 3A, the rubberband will be stretched so as to seek the equilibrium condition of equation (8).

It can be seen from an inspection of FIGS. 3A, 3B and 3C that the interval between the times that the formations are irradiated with neutrons must be sufficiently great so as to not interfere with the measurement operation for the largest possible formation $\tau$. That is, the period of each cycle of operation must be greater than $9\tau$ for the greatest possible $\tau$. Thus, if $\tau$ is very small, there will be a large amount of dead time between the end of a measurement operation (the end of gate interval III) and the beginning of the next cycle of operation. In this connection, it would be desirable to eliminate this dead time so as to obtain the greatest possible statistical advantage.

Figure 3J:
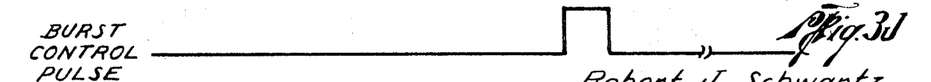

Thus, referring back to FIG. 1, the timing control circuit 37 is adapted to generate the burst control pulse shown in FIG. 3J so as to cause the ion source pulse to always be generated at a time beginning at 9T and ending at 10T. By making the ion source pulse always 1T wide, the neutron population will always increase on the average to substantially the same peak value if $T = \tau$ and thus the signal pulse repetition rate will be predictable regardless of the value of $\tau$. By so doing, the repetition rate of the signal pulses applied to the cable can be set near the maximum permissible repetition rate of the cable for any value of $\tau$, again enabling the greatest possible statistical advantage for any value of $\tau$. This burst control pulse from timing control circuit 37 is passed by way of a switch 60 to a cable-driving amplifier 62 which transmits the burst control pulse to the downhole circuitry.

In the downhole circuitry, the burst control pulse is shaped and differentiated by suitable pulse-shaping and differentiating circuits 63. The leading edge of this shaped pulse sets a flip-flop 64 whose normal output energizes an amplifier 65 to pass current to the pulsed neutron source 14 by way of a double-throw switch 66. The trailing edge of the shaped pulse resets the flip-flop 64 so as to turn off the current being supplied to the neutron source 14. As a safety precaution, the leading or rising edge of the normal output signal from flip-flop 64 causes a one-shot 67 to reset the flip-flop 64 at some later time. The period or on-time of this one-shot 67 is slightly greater than the maximum anticipated decay time $\tau$, so that under normal operation, the trailing edge of the burst width control pulse from the surface electronic circuitry will reset the flip-flop 64.

Figure 4A:
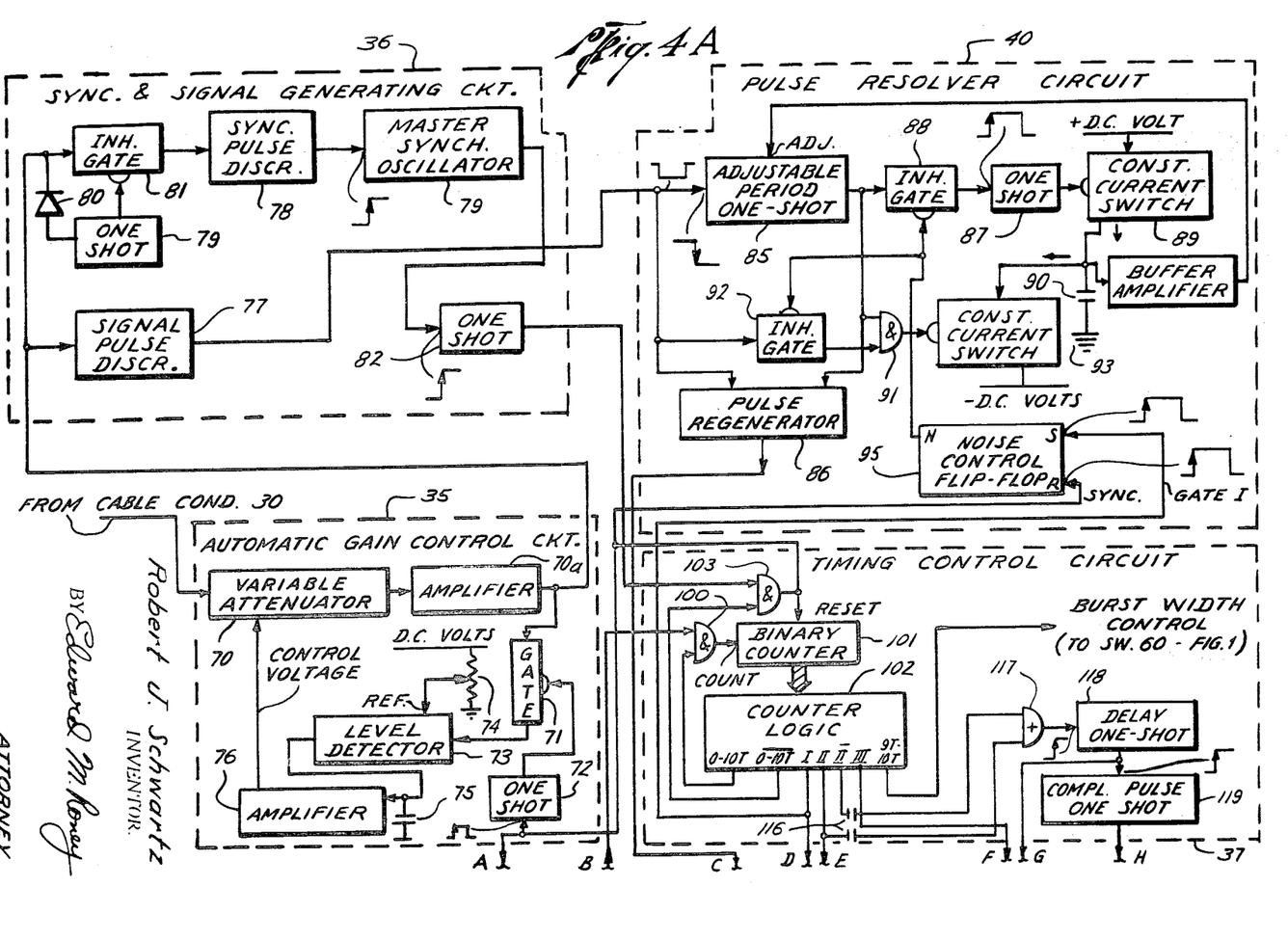
FIGS. 4A and 4B illustrate certain portions of the FIG. 1 circuitry in greater detail (FIG. 4A is positioned horizontally over FIG. 4B to make a complete diagram)
Figure 4B:
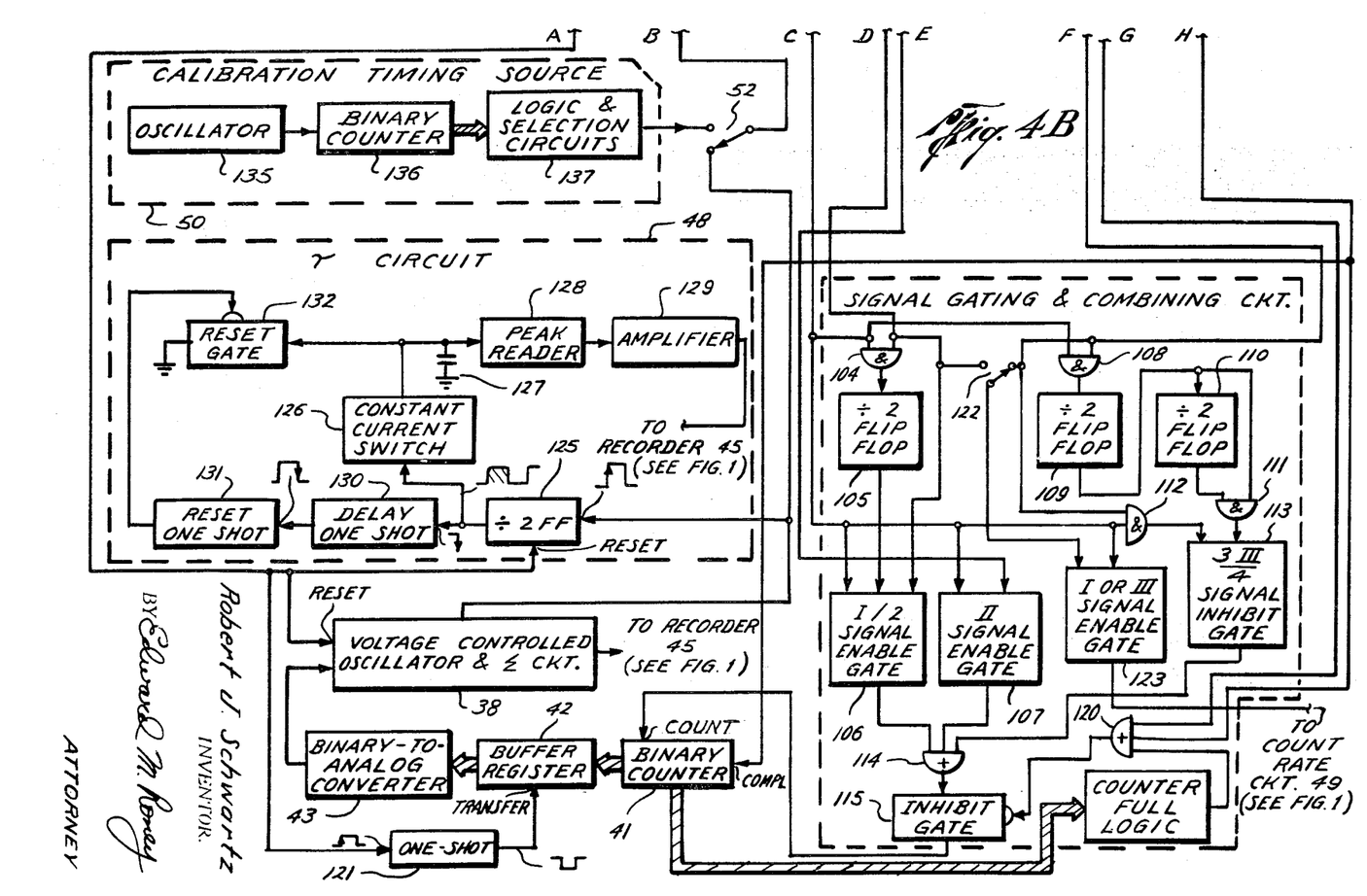

Now referring to FIGS. 4A and 4B, there is shown the surface electronic circuits of FIG. 1 in greater detail. To make a complete picture of FIG. 4, FIG. 4A is horizontally positioned over FIG. 4B. The signal pulses from the cable conductor 30 are applied to the automatic gain control circuit 35. Within the gain-control circuit, these pulses are first applied to a variable attenuator circuit which is operative to adjust the attenuation applied to the input signals in response to a control voltage. To produce the control voltage, the signals from variable attenuator 70 are amplified by an amplifier 70a and applied to a gate circuit 71 which is operative in response to a one-shot 72 to select only the sync pulse for application to a level detector 73.

As seen from FIG. 2H, the sync pulse is preceded and followed by a blank period thereby insuring a minimum of interference from the signal pulses. Thus, the sync pulse provides reliable information as to gain-control factors such as cable attenuation, downhole voltage and amplification, drift, etc.

The level detector 73 which could take the form of a differential amplifier, compares the amplitude, desirably the peak amplitude (in which case the level detector 73 would include a peak detector), of the sync pulse with a reference voltage derived from a potentiometer 74 and generates an output current to a capacitor 75 in proportion to the difference in magnitude between the reference voltage and the sync pulse voltage. The voltage stored by capacitor 75 is buffered by an amplifier 76 and applied to the variable attenuator 70 so as to vary the attenuation thereof such that the amplitude of the sync pulses will equal the reference voltage from potentiometer 74.

Thus, so long as the sync pulse amplitude equals the reference voltage, the charge on capacitor 75 will remain unchanged and the attenuation applied to the incoming sync and signal pulses by the variable attenuator 70 will remain constant. However, should the sync voltage amplitude change, an amount of charge proportional to the error or difference between the sync pulse and reference amplitude will be added to or subtracted from capacitor 75 to thereby change the voltage. Since the discharge resistance presented to capacitor 75 is very high, the capacitor 75 acts as an integrator operating to adjust the attenuation of variable attenuator 70 until the sync voltage amplitude equals the reference voltage. Thus, the gain control circuit is a negative feedback loop which seeks a "no-change" equilibrium condition.

The output sync and signal pulses from the amplifier 70 of automatic gain-control circuit 35 are then applied to the sync and signal generating circuit 36. Concerning the positive going sync pulses, these pulses are applied to a sync pulse discriminator 78 which operates to detect positive going pulses having an amplitude greater than a predetermined threshold level. However, there is a possibility that a plurality of closely spaced negative going signal pulses will generate a voltage overshoot which could be mistaken for a sync pulse. Moreover, the positive overshoot resulting from the negative going signal pulses enhances the possibility of noise combining with this overshoot to trigger the sync pulse discriminator 78 erroneously. To prevent this occurrence, a one-shot 79 is energized by each negative going signal pulse by way of a back-biased diode 80 so as to energize an inhibit gate 81. The gate 81 inhibits the transmitted signals from being applied to the sync pulse discriminator 78 for a given time interval after each negative going signal pulse has been detected. This inhibit time interval is desirably set sufficiently long to just encompass the positive overshoot portion of each negative signal pulse. By so doing, the positive overshoot portion of a negative signal pulse will not be passed to the sync pulse discriminator 78.

Figure 5A:
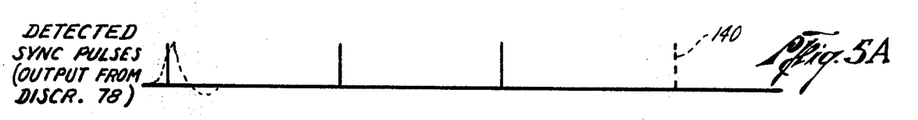
FIGS. 5A–5K represent voltage waveforms found at various points in the FIGS. 4A and 4B circuitry for purposes of explaining the operation thereof.
Figure 5B:
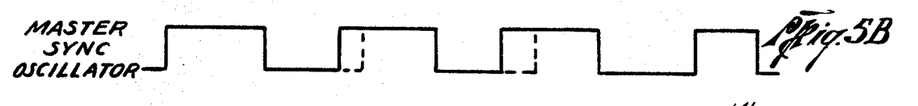

The output sync pulses from the discriminator 78, shown in FIG. 5A, are used to synchronize the phase of a master sync oscillator 79 which has a period slightly greater than the period of the sync pulses. The waveform of the output signal from the master sync oscillator is shown in FIG. 5B. The positive going edge of the master sync oscillator output signal triggers a sync one-shot to generate a new sync pulse shown in FIG. 5C. Thus, if a sync pulse is not received from the cable for one reason or another, the master sync oscillator 79 will eventually generate a synthetic sync pulse. However, if a sync pulse is received, it will reset the master sync oscillator 79 to its "1" state to produce a generated sync pulse of FIG. 5C. Thus, the longer period of the master sync oscillator 79 is merely a safety precaution to insure that a sync pulse is always generated even if a sync pulse is not received. An example of this operation can be found in FIGS. 5A, 5B and 5C where the first three sync pulses of FIG. 5A force the oscillator signal of FIG. 5B to the "1" state to thereby cause the generation of the sync pulses of FIG. 5C. Now, assume that the next (fourth) sync pulses fails to show, as represented by the dashed line pulse 140 of FIG. 5A. In this event, the next rising edge of the FIG. 5B oscillator output signal will produce the sync pulse 141 of FIG. 5C.

Now referring to the signal pulse channel, the signal pulses from the automatic gain control circuit 35 are applied to a signal pulse discriminator 77 which operates to generate a signal pulse to operate the pulse resolver circuit 40 which acts to resolve signal pulses which were transmitted from the downhole apparatus at such closely spaced intervals they they have become merged into one composite pulse during transmission.

Inside the pulse resolver circuit 40, the leading or falling edge of the detected signal pulses energize an adjustable period one-shot 85 whose period is set to be slightly greater than the period of a single detected signal pulse. The output of the adjustable period one-shot 85 and the detected signal pulse are both applied to a pulse-regenerating circuit 86 which operates to generate one pulse if the period of the synthetic pulse from one-shot 85 is greater than the period of the detected signal pulse. If on the other hand, the period of the synthetic pulse is less than the period of the detected signal pulse thus indicating that two signal pulses have been merged together, the pulse-regenerating circuit 86 operates to generate two pulses.

To insure that the period of the output pulse from adjustable period one-shot 85 is always a fixed amount greater than the pulse width of a single detected signal pulse, the leading edge of the output pulse from the adjustable period one-shot 85 energizes a fixed time duration one-shot 87 by way of a normally disabled inhibit gate 88. The one-shot 87 generates a pulse which causes a constant current switch 89 to supply a fixed amount of charge to a capacitor 90 each time a detected signal pulse is supplied to the pulse resolver circuit 40. The detected signal pulse from signal pulse discriminator 77 is also applied to one input of an AND gate 91 by way of a normally deenergized inhibit gate 92. The other input to the AND gate 91 is the synthetic signal pulse from the adjustable period one-shot 85. Thus, the output pulse from the AND gate 91 will have a duration equal to the time that both the synthetic pulse and the detected signal pulse are positive, i.e., at the 1 level and thus equal to the overlap between these two pulses. This overlap pulse energizes a constant current switch 93 for discharging the capacitor 90 at a fixed rate, i.e., subtracting an amount of charge proportional to the overlap duration from the capacitor 90. The voltage across the capacitor 90 is applied to the adjustable period one-shot 85 by way of a high impedance input amplifier 94 to adjust the period or pulse width of the synthetic pulse generated by the one-shot 85.

Since the impedance presented to capacitor 90 is extremely high, capacitor 90 acts as a true integrator with the currents from the constant current switches 89 and 93 being selected to maintain the overlap time or pulse width of the output pulse from AND gate 91 at a fixed value. Thus, for example, if the pulse width of the overlap pulse should become too low, the amount of charge taken from the capacitor 90 by the constant current switch 93 will be less than the charge placed on the capacitor 90 by the constant current switch 89. In this event, the charge or voltage on capacitor 90 will begin building up to thereby increase the pulse width of the synthetic pulse generated from one-shot 85. Moreover the amount of charge placed on or taken from the capacitor 90 in response to any single signal pulse is low enough that a relatively large number of pulses will be required to bring the system into equilibrium. By this arrangement, the response time of the adjustment circuitry of the pulse resolver circuit 40 is sufficiently slow to prevent a few merged pulses from upsetting the operation of the circuit.

Along the same lines, it will be recalled that the signal pulse repetition rate is very high immediately after irradiating the formations with neutrons, as shown in FIGS. 2E, 2F and 2G. Thus, the probability of merged doublet pulses being received from the cable at such a time is very high. Since the pulse resolver circuit 40 assumes initially that every received signal pulse is a lone, single pulse, the pulse width adjustment operation might not be accurate. To circumvent this problem, the inhibit gates 88 and 92 are energized by the normal output of a noise control flip-flop 95 during those time periods when the probability of receiving a large number of merged doublet pulses is high to thereby disable the pulse width adjustment operation during this time. A more detailed explanation of the pulse resolver circuit 40 will be found in copending application Ser. No. 767,904 by Robert J. Schwartz filed on Sept. 18, 1968.

The cooperation of the automatic gain control circuit 35, sync and signal generating circuit 36, and pulse-resolving circuit 40 should briefly be set forth here. The threshold levels of the sync and signal discriminators 77 and 78 should be set high enough to exclude noise (and pulse overshoot) but low enough to prevent missing any genuine pulses. Since the signal strength of the signals received at the surface of the earth can vary widely, it can be seen that both of these conditions may not be satisfied simultaneously. Moreover, the pulse-resolving circuit 40 depends on an accurate detection of these pulses. Thus, the automatic gain-control circuit 35 normalizes the signal strength of the received well-logging signals in accordance with these threshold levels. By so doing, both of the above-discussed high and low conditions can be met thus providing a great amount of system accuracy and reliability.

Now concerning the timing control circuit 37, the T pulses from the voltage-controlled oscillator 38 are supplied by way of an AND gate 100 to the count input of a binary counter 101. A suitable counter logic circuit 102 is responsive to the various stages in counter 101 to generate the necessary control signals in correlation with the state of counter 101. To insure that the counter 101 is not advanced past the 10T state, a $\overline{OT-10}$ is utilized to enable the AND gate 100 to pass the T pulses only from OT to 10T. To insure that binary counter 101 is properly synchronized with the operation of the downhole electronics the sync pulse output from the sync and signal generating circuit 36 is utilized to reset the binary counter 101 to its 0 state by way of an AND gate 103. To insure that the sync pulse does not reset counter 101 prematurely $\overline{OT-10T}$ logic output signal (shown in FIG. 5F) from the counter logic circuit 102 enables the AND gate 103 to pass the sync pulse after 10T pulses have been counted and before the counter 101 begins advancing from OT–10T again. Thus, the output pulse from AND gate 103 is an authenticated or verified sync pulse. This authenticated sync pulse is fed back to energize the one-shot 72 of the gain-control circuit 35 for enabling the determination of the level of gain as represented in FIG. 5D. Additionally, the leading edges of each authenticated sync pulse and gate I timing pulse set and reset respectively the noise control flip-flop 95 of the pulse-resolver circuit 40 to disable the automatic pulse width adjustment operation during this time, as shown in FIG. 5E.

The gate I output from the counter logic circuit 102, which is active from 2T–3T, enables an AND gate 104 to pass the resolved signal pulses from the pulse resolver circuit 40 to the trigger input of a divide-by-2 flip-flop 105 during the timing interval I. The normal output of the trigger flip-flop 105 is then passed to an AND gate 106 designated I/2 signal enable gate. This gate 106 also receives the gate I logic output from the counter logic circuit 102 and the resolved signal pulses from circuit 40. Thus, every other signal pulse will be passed through the gate 106 thereby providing the I/2 scale factor called for by equation (8). The gate II logic output from the counter logic circuit 102 enables an AND gate 107 designated "II signal enable gate" so as to pass the resolved signal pulses from circuit 40 during the gate II timing interval.

To produce the 3/4 III portion of equation (5), the gate III control pulse from the counter logic circuit 102 enables an AND gate 108 to pass the resolved signal pulses to a divide-by-2 flip-flop 109 whose square wave output is supplied to a second divide-by-2 flip-flop 110. The normal output of both divide-by-2 flip-flops 109 and 110 is applied to the input of an AND gate 111 whose output will be at the "1" level for one out of every four resolved signal pulses. The resolved signal pulses are also applied to the input of an AND gate 112 which is enabled by the gate III control signal from logic circuit 102 to pass the resolved signal pulses during the gate III timing interval to a 3/4 III signal inhibit gate 113. The output pulse from AND gate 111 then operates to energize the gate 113 so as to inhibit every fourth resolved signal pulse and thus pass three out of four of such pulses.

The I/2 pulses from gate 106, the II pulses from gate 107 and the 3/4 pulses from gate 113 are combined in an OR gate 114 and supplied to the count input of the binary counter 41 by way of a normally deenergized inhibit gate 115. To produce the earlier discussed complementing operation with binary counter 41, the gate II timing interval signal from the counter logic circuit 102, as well as the gate II signal complemented, designated $\overline{\text{II}}$, energize a delay one-shot 118 on their rising edge by way of an OR gate 117. The leading edge of the delay pulse from delay one-shot 118 energizes a complement pulse one-shot which generates a pulse for complementing the binary counter 41 at the beginning and end of gate-timing interval II.

To insure that the complementing operation does not interfere with the operation of the counter 41 in processing earlier received pulses from OR gate 114, the complement pulse from one-shot 119 as well as the delay pulse from delay one-shot 118 are utilized to energize the inhibit gate 115 by way of an OR gate 120. This prevents any new pulses being applied to counter 41 just prior to or during the complementing operation. Additionally, a counter-full logic circuit 121 monitors the various stages of the binary counter 41 and operates to energize the inhibit gate 115 by way of the OR gate 120 to prevent the counter 41 from inadvertently resetting itself if its storage capacity should be exceeded. In this connection it should be pointed out that the capacity of counter 41 will desirably be set high enough to prevent such an occurrence.

The individual stages of binary counter 41 are coupled to the buffer register 42 which stores the contents of counter 41 and transfers this data to the binary-to-analog converter 43 in response to the authenticated sync pulse from the output of AND gate 103, which sync pulse is shaped by a suitable one-shot 121. The output voltage from the binary-to-analog converter 43 then energizes the voltage-controlled oscillator and Σ circuit 38 to generate pulses in accordance with the previous discussion. The oscillator circuit 38 is reset in phase by each authenticated sync pulse to assure that all of the oscillator periods following the sync pulse are of the same duration.

The signal-gating and combining circuit 39 is also adapted to select either the gate I or gate III pulses for application to the count rate circuit 49 of FIG. 1. To accomplish this, a double-throw switch 122 selects either the gate I or gate III control pulse from the counter logic circuit 102 for enabling an AND gate 123 designated "I or III signal enable gate." The other input to gate 123 is the resolved signal pulses from the pulse resolver circuit 40. Thus, the gate 123 passes the resolved signal pulses during one of the selected gating intervals to the count rate circuit 49.

Now concerning the operation of the τ circuit 48, the leading edge of the τ pulses from the oscillator circuit 38 energize a divide-by-2 flip-flop 125 whose output energizes a constant current switch 126 on the positive half cycle of the output square wave from flip-flop 125. This causes the constant current switch 126 to charge up a capacitor 127 at a constant rate as long as the output from flip-flop 125 is positive. As soon as the output square wave from flip-flop 125 changes to its zero state, the constant current switch 126 is turned off and the capacitor 127 holds its charge. Thus, the charge of voltage on capacitor 127 will be proportional to the period of the output signal from oscillator circuit 38, i.e., proportional to τ. This sawtooth voltage is shown in FIG. 5J. A peak reader circuit 128 reads the peak voltage to which capacitor 127 is charged and supplies this peak voltage to the recorder 45 by way of a buffer amplifier 129. The buffer amplifier 129 can include suitable filtering to smooth out fluctuations arising from the peak-reading operation, or the mechanical damping of the recorder can accomplish this.

To resist the capacitor 127 in preparedness for another charging cycle, the falling edge of the square wave output signal from flip-flop 129 energizes a delay one-shot 130. The trailing edge of the delay pulse energizes a "reset one-shot" 131 to cause a reset gate 132 to discharge the capacitor 127 to a fixed reference charge. This time delay provided by delay one-shot 130 gives the peak-reading circuit 128 sufficient time to read accurately the peak voltage on capacitor 127 before the reset gate 132 discharges the capacitor 127. The authenticated sync pulse from AND gate 103 of the timing control circuit 37 resets the flip-flop 125 so that if the first oscillator period immediately following the sync pulse is not exactly the same duration as the others following, it will not be read by the peak reader. This reset operation is depicted in FIG. 5J at 50 and 51.

To provide a means of calibrating the circuitry of FIG. 4, the calibration timing source 50 generates accurate amplitude and frequency pulses which can be substituted for the τ pulses from oscillator circuit 38 by moving the double-throw switch 52 to the proper position. Within the calibration-timing source 50, an accurate frequency oscillator 135 generates pulses which are counted by a binary counter 136. The various stages of the binary counter 136 are connected to suitable logic circuitry for generating discrete timing pulses. Desired ones of these discrete pulses can then be selected by suitable selection switches for application to the double-throw switches 51 (See FIG. 1) and 52.

Now referring to FIGS. 5A–5K in conjunction with FIG. 4 to summarize the operation of the FIG. 4 apparatus, the transmission signal (See FIG. 2G) is processed through the automatic gain-control circuit 35. The gain-control circuit 35 reads the amplitude of the sync pulses and adjusts the gain (or attenuation) of the variable attenuator 70. The gain adjusted transmission pulses are then applied to the sync and signal-generating circuit 36.

Figure 5C:
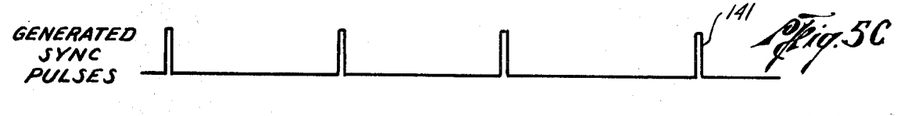
Figure 5D:
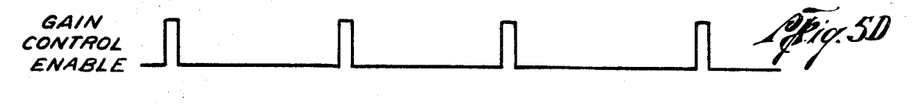
Figure 5E:
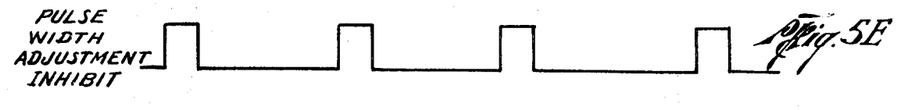
Figure 5F:
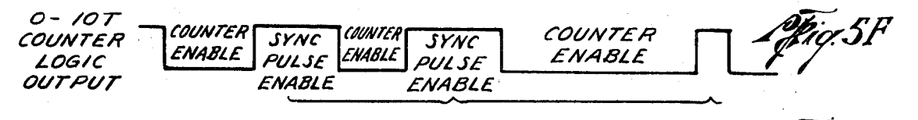

The detected sync pulses of FIG. 5A from the sync pulse discriminator 78 of the sync and signal-generating circuit 36 synchronizes the master sync oscillator 79 (FIG. 5B) to produce the resulting generated sync pulses of FIG. 5C. By so doing, a sync pulse will always be available for synchronizing the operation of the surface electronics with the repetitive irradiation of the formations with neutrons. Moreover, if the counter logic circuit 102 controls the downhole neutron generation (switches 60, 61 and 66 in normally open position), the failure of the sync and signal generating circuit 36 to generate a sync pulse would bring the overall operation of the system to a halt without this safety feature. The generated sync pulse is then checked for authenticity by the AND gate 103 in response to the state of binary counter 101.

This authenticated sync pulse from AND gate 103 energizes the one-shot 72 for enabling the operation of the automatic gain control circuit 35 when a sync pulse is received in the surface electronics as represented in FIG. 5D. It should be noted here that the peak value of each sync pulse received from the cable (e.g., the dotted line pulse of FIG. 5A) occurs after the initiation of each "gain control enable" pulse of FIG. 5D due to the selection of the threshold level of the sync pulse discriminator 78. The signal pulses from the signal pulse discriminator 77 are then applied to the pulse-resolver circuit 40 which operates to resolve the signal pulses by comparing the detected signal pulses from sync and signal-generating circuit 36 with a synthetic pulse. The resolver circuit 40 also operates to automatically adjust the pulse width of this synthetic pulse to keep the overlap between the synthetic pulse and each single signal pulse constant. To prevent this overlap pulse control operation from being adversely affected during time intervals where the probability of receiving a large number of merged pulses is high, the noise control flip-flop 95 operates to inhibit this adjustment operation from the time that the sync pulse is received until the initiation of the gate I interval, as represented in FIG. 5E.

Figure 5G:
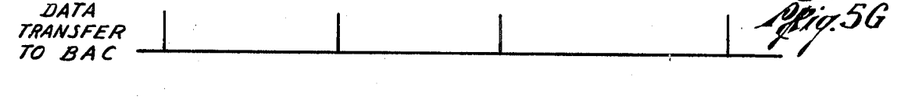
Figures 5H, 5I:
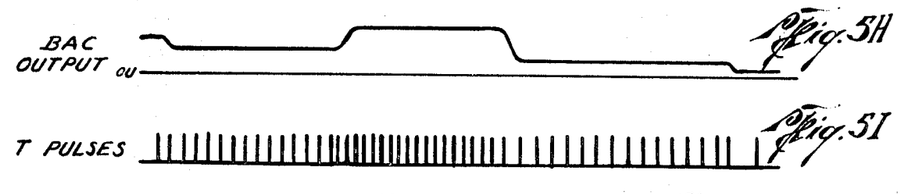
Figure 5J:
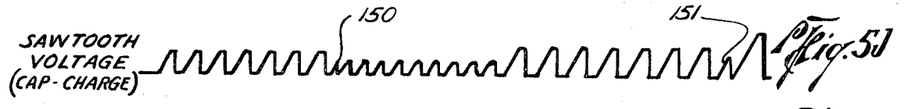
Figure 5K:
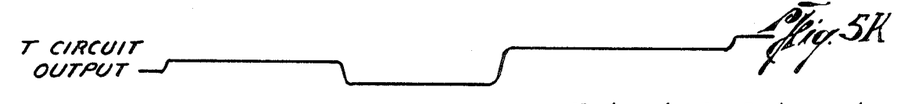

The resolved signal pulses from resolver circuit 40 are then applied to the signal gating and combining circuit 39 which operates to feed these pulses at the proper times and in the proper weights to the binary counter 41 via the OR gate 114 and inhibit gate 115. The binary counter 41 is complemented by complement pulses from the complement pulse one-shot 119 before and after gating interval II. The data transfer pulses of FIG. 5G which are generated in response to the authenticated sync pulses from AND gate 103, transfer the contents of the buffer register to the binary-to-analog converter 43. Thus, the binary-to-analog converter output voltage will change amplitude, if required, each time the data transfer pulse of FIG. 5G is generated as seen by comparing FIGS. 5G and 5H. The binary-to-analog output voltage of FIG. 5H then causes the frequency of the T pulses of FIG. 5I to change correspondingly.

It can thus be seen that the methods and apparatus of the present invention have enabled an accurate determination of the rate of decay of the neutron population in a formation after irradiation of the formation with neutrons. This has been accomplished with a digital system, thus eliminating any errors which might arise from analog processing of data. Thus, for example, there is no leakage problem when utilizing the digital-counting means 41. Additionally, by utilization of novel gain-control and resolving circuits, the signal pulses being processed by the signal-gating and combining circuits 38 and binary counter 41 will be accurately representative of the pulses transmitted from the downhole equipment, thus rendering the overall system more accurate.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for investigating earth formations traversed by a borehole, comprising:
   means for repetitively irradiating a formation with neutron pulses;
   detector means for generating a plurality of electrical pulses which vary with time as a function of the neutron population in a formation, at least part of said pulses representing the neutron population due to said irradiation; and
   digital-counting means for adding at least a portion of those electrical pulses which are generated during a selected time interval after irradiation with a given neutron pulse and subtracting at least a portion of those electrical pulses which are generated during another time interval after irradiation with said given neutron pulse whereby the accumulated count in said digital counting means will be representative of a formation characteristic.

2. Apparatus for investigating earth formations traversed by a borehole, comprising:
   means for repetitively irradiating a formation with neutrons;
   detector means for generating a plurality of pulses which vary with time as a function of the neutron population in a formation, at least part of said pulses representing the neutron population due to said irradiation;
   means for passing at least a portion of those pulses generated during a first time interval and at least a portion of those pulses generated during a second time interval;
   digital-counting means for adding said first interval pulses and subtracting said second interval pulses from said first time interval pulses to produce an accumulated count in said counting means after each irradiation; and
   means responsive to the accumulated count of said counting means after each irradiation for adjusting said first and second time intervals until said accumulated count assumes a substantially constant level for each repetitive irradiation, said time intervals being representative of a formation characteristic.

3. Apparatus for investigating earth formations traversed by a borehole, comprising:
   means for repetitively irradiating a formation with neutrons;
   detector means for generating a plurality of pulses which vary with time as a function of the neutron population in a formation after each repetitive irradiation, at least part of said pulses representing the neutron population due to said irradiation;
   gating means for passing at least a portion of those pulses generated during a first time interval after each irradiation and at least a portion of those pulses generated during a second time interval after each irradiation;
   digital-counting means for adding said first interval pulses and subtracting said second interval pulses to produce an accumulated count in said counting means;
   means responsive to said accumulated count for generating a control signal having a frequency representative of said accumulated count;
   means responsive to said control signal for energizing said gating means, the frequency of said control signal determining said first and second time intervals; and
   means responsive to the period of said control signal for indicating the rate of decay of the neutron population in a formation.

4. Apparatus for investigating earth formations traversed by a borehole, comprising:
   means repetitively for irradiating a formation with neutrons;
   detector means for generating a plurality of pulses which vary with time as a function of the neutron population in a formation, at least part of said pulses representing the neutron population due to said irradiation;
   gating means for passing at least a portion of those pulses generated during a first time interval and at least a portion of those pulses generated during a second time interval;
   digital-counting means for counting the pulses passed by said gating means;
   means responsive to the accumulated count of said counting means after said first and second time interval pulses have been counted for generating a control signal having a frequency representative of said accumulated count; and means responsive to said control signal for energizing said gating means to pass said first and second series of pulses to said counting means and complementing said counting means before and after said second time interval so that said second series of pulses will be subtracted from said first series of pulses to produce an accumulated count representative of a formation characteristic.

5. Apparatus for investigating earth formations traversed by a borehole, comprising:

means for irradiating a formation with neutrons and generating a sync pulse representative of the occurrence of said irradiation;

detector means for generating a plurality of pulses which vary with time as a function of the neutron population in a formation, at least part of said pulses representing the neutron population arising from said irradiation;

means for adding at least a portion of those pulses which are generated during a first time interval after irradiation and subtracting at least a portion of those pulses which are generated during a second time interval after irradiation to produce a control signal;

means responsive to said control signal for adjusting said first and second time intervals, the frequency of said control signal being representative of a formation characteristic; and converting means responsive to said control signal for generating an output signal representative of the period of said control signal to provide a measure of another formation characteristic, said converting means including: means for dividing the frequency of said control signal by a given factor; sawtooth generator means responsive to the divided control signal for generating a sawtooth wave having a constant voltage slope and a peak amplitude representative of the period of said control signal; means responsive to said peak amplitude for generating said output signal representative of the period; and means for resetting said frequency-dividing means with said sync pulse to thereby synchronize the phase of said sawtooth wave with said sync pulse.

6. Apparatus for investigating earth formations traversed by a borehole, comprising:

means for repetitively irradiating a formation with neutron pulses;

detector means for generating a plurality of electrical pulses which vary with time as a function of the neutron population in a formation, at least part of said pulses representing the neutron population due to said irradiation; and means for adding at least portions of those electrical pulses which are generated during first and second time intervals after irradiation with a given neutron pulse and subtracting at least a portion of those electrical pulses which are generated during a third time interval after irradiation with said given neutron pulse whereby the accumulated count in said digital-counting means will be representative of a formation characteristic.

7. Apparatus for investigating earth formations traversed by a borehole, comprising:

means for repetitively irradiating a formation with neutrons;

detector means for generating a plurality of pulses which vary with time as a function of the neutron population in a formation, at least part of said pulses representing the neutron population due to said irradiation;

gating means for passing at least portions of those pulses which are generated during first, second and third time intervals after irradiation;

digital-counting means for adding said pulses which are passed by said gating means; and means responsive to the accumulated count of said counting means after said first, second and third time interval pulses have been counted for energizing said gating means to pass said pulses and for complementing said digital-counting means before and after said second time interval so that said second interval pulses will be subtracted from said first and third interval pulses, said accumulated count being representative of a formation characteristic.

8. Apparatus for investigating earth formations traversed by a borehole, comprising:

means for repetitively irradiating a formation with neutrons;

detector means for generating a plurality of pulses which vary with time as a function of the neutron population in a formation, at least part of said pulses representing the neutron population due to said irradiation;

gating means for passing one of every two of said pulses during a first time interval after irradiation, all of said pulses during a second time interval after irradiation, and three of every four of said pulses during a third time interval after irradiation; and digital-counting means for subtracting said second time interval pulses from said first and third time interval pulses whereby the accumulated count in said counting means will be representative of a formation characteristic.

9. Apparatus for investigating earth formations traversed by a borehole, comprising:

means for repetitively irradiating a formation with neutrons;

detector means for generating a plurality of pulses which vary with time as a function of the neutron population in a formation, at least part of said pulses representing the neutron population due to said irradiation;

gating means for passing one of every two of said pulses during a first time interval after irradiation, all of said pulses during a second time interval after irradiation, and three of every four of said pulses during a third time interval after irradiation;

digital counting means for counting said pulses passed by said gating means; and means responsive to the accumulated count of said counting means for energizing said gating means to pass said pulses during said first, second, and third time interval and for complementing said digital-counting means before and after said second time interval so that said second time interval pulses will be subtracted from said first and third time interval pulses, the accumulated count of said counting means being representative of a formation characteristic.

10. Apparatus for investigating earth formations traversed by a borehole, comprising:

means adapted for repetitively irradiating a formation with neutrons;

detector means for generating a plurality of signal pulses which vary with time as a function of the neutron population in a formation, at least part of said signal pulses representing the neutron population due to irradiation of a formation with neutrons;

gating means for passing at least a portion of those signal pulses generated during a first time interval and at least a portion of those pulses generated during a second time interval;

digital-counting means for adding said first interval pulses and subtracting said second interval signal pulses from said first time interval signal pulses to produce an accumulated count in said counting means after each repetitive irradiation; and control means responsive to the accumulated count of said counting means for energizing said gating means during said first and second time intervals and generating a control signal for energizing said irradiating means after said first and second time intervals associated with each repetitive irradiation, whereby the time period of said time intervals is representative of the rate of decay of the neutron population in an earth formation.

11. The apparatus of claim 10 wherein the control means includes means responsive to the accumulated count of said counting means for generating timing pulses having a period representative of said neutron decay rate, second counting means for counting said timing pulses; means responsive to the count of said second counting means for generating first and second time interval control signals for energizing said gating means to pass said generated signal pulses and for generating said control signal for energizing said irradiating means.

12. Apparatus for processing well-logging data derived from an exploring means in a borehole for investigating adjacent earth formations, comprising:
- input means for receiving well-logging data in the form of a plurality of pulses;
- digital counting means for adding at least a portion of those pulses which are received during a first time interval and subtracting at least a portion of those pulses which are received during a second time interval;
- means responsive to the accumulated count of said digital-counting means for generating a control signal whose frequency is representative of said accumulated count; and
- means responsive to said control signal for adjusting said first and second time intervals to cause said accumulated count to assume a substantially constant level, whereby the frequency of said control signal will be representative of a formation characteristic.

13. Apparatus for processing well-logging data derived from an exploring means in a borehole, comprising:
- input means for receiving well-logging data which is in the form of a plurality of pulses;
- gating means for passing a first series of pulses during a first time interval and a second series of pulses during a second time interval;
- digital-counting means for adding at least a portion of those pulses which are received during said first time interval and subtracting at least a portion of those pulses which are received during said second time interval;
- means responsive to the accumulated count of said digital-counting means for generating a control signal whose frequency is representative of said accumulated count;
- means responsive to said control signal for energizing said gating means to pass said first and second series of pulses, the frequency of said control signal being adjusted until said accumulated count assumes a substantially constant level; and
- means for measuring the frequency of said control signal to provide an indication of a formation characteristic.

14. Apparatus for determining the rate of change of a well-logging signal which is in the form of a plurality of pulses, comprising:
- input means for receiving the pulses;
- gating means for passing at least a portion of those pulses received during a first time interval and at least a portion of those pulses received during a second time interval;
- digital-counting means for adding the first interval of pulses and subtracting the second interval pulses;
- means responsive to the accumulated count of said counting means for generating a control signal at a control frequency; and
- means responsive to the frequency of said control signal for energizing said gating means to pass said pulses during said first and second time intervals whereby the frequency of said control signal will be representative of the rate of change of said well-logging signal.

15. Apparatus for determining the rate of change of a well-logging signal which is in the form of a repetitive train of pulses, the repetition rate of the pulses in each repetitive pulse train decreasing with time, comprising:
- input means for receiving the pulses;
- gating means for passing at least a portion of those pulses received during a first time interval of each pulse train and at least a portion of those pulses received during a second time interval of each pulse train;
- reversible digital-counting means for subtracting said second interval pulses from said first interval pulses of each pulse train;
- means responsive to the accumulated count of said counting means for generating a control signal at a control frequency; and
- means responsive to the frequency of said control signal for energizing said gating means to pass said first and second interval pulses whereby said first and second time intervals will be functions of said control frequency and the rate of change of the pulse repetition rate will be related to said control frequency.

16. Apparatus for determining the rate of change of a well-logging signal which is in the form of a plurality of pulses, comprising:
- input means for receiving the pulses;
- gating means for passing at least a portion of those pulses received during a first time interval and at least a portion of those pulses received during a second time interval;
- digital-counting means for counting the pulses passed during said first and second time intervals;
- means responsive to the accumulated count of said counting means for generating a control signal at a control frequency; and
- means responsive to said control signal for complementing said digital-counting means before and after said second time interval so that said second interval pulses will be subtracted from said first interval pulses and energizing said gating means to pass said first and second interval pulses whereby the frequency of said control signal will be representative of the rate of change of said well-logging signal.

17. Apparatus for determining the rate of change of a well-logging signal which is in the form of a plurality of pulses, comprising:
- input means for receiving the pulses;
- gating means for passing at least a portion of those pulses received during a first time interval and at least a portion of those pulses received during a second time interval;
- digital-counting means for adding the first series of pulses and subtracting the second series of pulses;
- means responsive to the accumulated count of said counting means for generating control pulses whose period is representative of the time constant of said well-logging signal; and
- means responsive to said pulses for energizing said gating means to pass said first and second interval pulses, said first and second time intervals being correlated with the period of said control pulses whereby the accumulated count of said counting means will remain constant so long as the period of said control pulses is accurately representative of the time constant of said well-logging signal.

18. Apparatus for determining the rate of change of a well-logging signal which is in the form of a plurality of pulses whose repetition rate decays with time and eventually levels off to a background or quiescent level, comprising:
- input means for receiving the pulses;
- gating means for passing at least a portion of those pulses received during first, second and third time intervals;
- digital-counting means for subtracting those pulses passed during the second time interval from those pulses passed during the first and third time intervals;
- means responsive to the accumulated count of said counting means for generating a control signal at a control frequency;
- means responsive to the frequency of said control signal for energizing said gating means to pass said pulses, said third time interval being selected to coincide with that portion of the well-logging signal which reflects the background level; and
- means responsive to the frequency of said control signal for providing an indication of the rate of change of said well-logging signal.

19. Apparatus for adjusting the signal strength of well-logging signals derived from an exploring means of the type which repetitively emits energy into a media surrounding an exploring means and produces a sync pulse representative of the time of such emission as well as information signals representative of the reaction of the media to said emitted energy, comprising:
- input means for receiving well-logging signals;

gain adjustment means for adjusting the signal strength of said welltlogging signals; and means responsive to each sync pulse for generating a gain control signal for application to said gain adjustment means to adjust the gain thereof so as to maintain the amplitude of said sync pulses substantially constant.

20. Apparatus for adjusting the signal strength of well-logging signals derived from an exploring means of the type which repetitively emits energy into a media surrounding an exploring means and produces a sync pulses representative of the time of such emission as well as information signals representative of the reaction of the media to said emitted energy, comprising:

input means for receiving well-logging signals;

gain adjustment means for adjusting the signal strength of said well-logging signals to produce gain adjusted well-logging signals; and means responsive to gain adjusted sync pulses for generating a gain-control signal for application to said gain adjustment means to adjust the gain thereof so as to maintain the amplitude of said sync pulses constant.

21. The apparatus of claim 20 wherein said means for generating a gain-control signal includes:

charge storage means;

means for comparing the amplitude of each gain-adjusted sync pulse with a reference amplitude and changing the charge in said charge storage means in proportion to the difference between said compared amplitudes; and means for generating said gain-control signal in accordance with the amount of charge stored by said charge storage means whereby the amplitude of said gain-adjusted sync pulses will be maintained substantially the same as said reference amplitude.

22. The apparatus of claim 20 wherein said means for generating a gain-control signal includes:

means for comparing the amplitude of said gain-adjusted sync pulse with a reference amplitude and producing an output signal representative of the difference between said two amplitude levels each time a sync pulse is received; and means responsive to said output signal for generating said gain-control signal whereby said gain-control signal will operate to maintain said sync pulse amplitude and reference amplitude substantially the same.

23. The apparatus of claim 20 wherein said means for generating a gain-control signal includes:

means for comparing the amplitude of said gain-adjusted sync pulse with a reference amplitude and producing an output signal having a voltage representative of the difference between said two amplitude levels each time a sync pulse is received;

storage means for accumulating said voltages; and means responsive to said accumulated voltages for generating said gain-control signal whereby said gain-control signal will act to maintain said sync pulse amplitude substantially the same as said reference amplitude.

24. Apparatus for adjusting the signal strength of well-logging signals derived from an exploring means of the type which repetitively emits energy into a media surrounding an exploring means and produces a sync pulse representative of the time of such emission as well as information signals representative of the reaction of the media to said emitted energy, comprising:

input means for receiving well-logging signals;

gain adjustment means for adjusting the signal strength of said well-logging signals;

means for detecting said sync pulses;

means responsive to said detected sync pulses for gating said gain-adjusted well-logging signals so that only sync pulses will be gated; and gain control means responsive to said gated gain-adjusted well-logging signals for generating a gain-control signal for application to said gain-adjustment means to adjust the gain thereof.

25. The apparatus of claim 24 wherein said means for generating a gain-control signal includes:

means for comparing the amplitude of said gated sync pulse with a reference amplitude and producing an output signal having a voltage representative of the difference between said two amplitude levels each time a sync pulse is gated to said gain-control means;

storage means for accumulating said voltages; and means responsive to said accumulated voltages for generating said gain-control signal whereby said gain-control signal will act to maintain said gated sync pulse amplitude substantially the same as said reference amplitude.

26. Apparatus for investigating earth formations traversed by a borehole, comprising:

means for irradiating a formation with neutrons and generating a sync pulse representative of the time of occurrence of said irradiation;

detector means for generating a plurality of signal pulses which vary with time as a function of the neutron population in a formation, at least part of said signal pulses representing the neutron population to said irradiation;

transmission means for transmitting said sync and signal pulses to the surface of the earth;

gain-adjustment means for adjusting the signal strength of the transmitted well-logging signals received at the surface of the earth;

means responsive to each received sync pulse for generating a gain-control signal for application to said gain adjustment means to adjust the gain thereof so as to maintain the amplitude of said sync pulse substantially constant; and means responsive to said received signal pulses from said gain-adjustment means for determining a characteristic of a formation surrounding a borehole.

27. Apparatus for investigating earth formations traversed by a borehole, comprising:

means for repetitively irradiating a formation with neutrons;

detector means for generating a plurality of signal pulses which vary with time as a function of the neutron population in a formation, at least part of said signal pulses representing the neutron population due to said irradiation;

transmission means for transmitting said signal pulses to the surface of the earth, said transmission means having transmission characteristics which tend to merge closely spaced signal pulses;

pulse-resolving means for resolving the transmitted signal pulses received at the surface of the earth into separate, individual pulses, said pulse-resolving means including means for generating, for each received signal pulse, a trigger pulse having a pulse width proportional to the pulse width of said received signal pulses and a reference pulse having a pulse width slightly greater than the pulse width of a single, unmerged signal pulse, means responsive to related trigger and reference pulses for generating resolved signal pulses, and automatic pulse width adjustment means responsive to said trigger and reference pulses for adjusting the reference pulse width to maintain a fixed relationship between the pulse widths of said trigger and reference pulses;

digital-counting means for adding at least a portion of those pulses which are generated during a first time interval after irradiation and subtracting at least a portion of those pulses which are generated during a second time interval after irradiation;

means responsive to the accumulated count of said counting means after said first and second time intervals for generating a control signal having a frequency representative of the rate of change of the repetition rate of said pulses; and means responsive to said control signal for controlling said first and second time intervals and disabling said automatic pulse width adjustment means during a time period following irradiation of a formation with neutrons so that said adjustment means will be disabled during time intervals when the repetition rate of said signal pulses is relatively high.

28. A method of investigating earth formations traversed by a borehole, comprising:
  repetitively irradiating a formation with neutrons;
  generating a plurality of pulses which vary with time as a function of the neutron population in a formation after each irradiation, at least part of said pulses representing the neutron population due to said irradiation;
  subtracting all of the pulses generated during a second time interval each after irradiation from one-half of the pulses generated during a first time interval after each irradiation and three-fourths of the pulses generated during a third time interval after each irradiation to obtain an accumulated count of said pulses; and
  adjusting the first, second and third time intervals in response to said accumulated count to minimize the net change in said accumulated count after the pulses resulting from each irradiation have been counted whereby said accumulated count is representative of a formation characteristic.

29. A method of investigating earth formations traversed by a borehole, comprising:
  repetitively irradiating a formation with neutrons;
  generating a plurality of pulses which vary with time as a function of the neutron population in a formation after each irradiation, at least part of said pulses representing the neutron population due to said irradiation;
  counting at least a portion of the pulses generated during a first time interval after each irradiation in a binary counting means;
  complementing the contents of said counting means after each of said first time intervals;
  counting at least a portion of the pulses generated during a second time interval after each irradiation; and
  complementing the contents of said counting means after said each of said second time intervals whereby the pulses generated during each of said second time intervals will have been subtracted from the pulses generated during each of said first time intervals to produce an accumulated count in said counting means after each irradiation which is representative of a formation characteristic.

30. The method of claim 29 and further including the steps of counting at least a portion of the pulses generated during a third time interval after each irradiation whereby said second time interval pulses will be subtracted from said first and third time interval pulses.

31. A method of investigating earth formations traversed by a borehole, comprising:
  repetitively irradiating a formation with neutrons;
  generating a plurality of pulses which vary with time as a function of the neutron population in a formation after each irradiation, at least part of said pulses representing the neutron population due to said irradiation;
  gating one-half of the pulses generated during a first time interval after each irradiation;
  gating all of the pulses generated during a second time interval after each irradiation;
  gating three-fourths of the pulses generated during a third time interval after each irradiation;
  counting all of said gated pulses to produce an accumulated count after each irradiation; and
  generating a control signal having a period representative of a formation characteristic, said first, second and third time intervals being functions of the period of said control signal.

32. A method of adjusting the signal strength of well-logging signals derived from an earth-formation-exploring means of the type which repetitively emits energy into a formation and produces signal pulses representative of a formation reaction to said emitted energy and a sync pulse representative of the time of such energy emission, comprising:
  receiving said well-logging signals from such an exploring means;
  adjusting the signal strength of said well-logging signals in response to a control signal;
  measuring the amplitude of each adjusted sync pulse; and
  comparing said measured amplitude with a reference amplitude and producing said control signal for adjusting the signal strength of said well-logging signals to maintain said adjusted sync pulse amplitude substantially the same as said reference amplitude.

33. In apparatus for energizing a pulsed neutron source, apparatus for producing a pulse representative of the termination of said energization, comprising:
  means for generating a pulse for application to a pulsed neutron source to cause the production of neutrons for emission into a surrounding media, said pulse having amplitude oscillations on the trailing edge portion thereof;
  means responsive to the first amplitude change on the trailing edge portion of said pulse for generating a timing pulse of a fixed time duration, which time duration exceeds said amplitude oscillations; and
  means responsive to the leading edge of said timing pulse for generating a pulse representative of the termination of neutron emission for transmission to the surface of the earth to enable said termination to be detected at the surface of the earth.

34. Apparatus for irradiating a formation traversed by a borehole, with neutrons and producing signals representative of the formation reaction to the neutrons and the time of termination of said irradiation for transmission to the surface of the earth, comprising:
  a pulsed neutron source;
  means for generating an energization pulse for energizing said neutron source to irradiate a formation with neutrons;
  detector means responsive to the neutron population produced by said neutron source for generating a plurality of signal pulses representative of said neutron population;
  means responsive to the trailing edge of said energization pulse for generating a delay pulse of a fixed time duration;
  means responsive to the leading edge of said delay pulse for generating a sync pulse representative of the time of termination of said neutron irradiation;
  means for transmitting the sync and signal pulses to the surface of the earth; and
  means responsive to the leading edge of said energization pulse and the trailing edge of said delay pulse for inhibiting the application of said signal pulses to said transmitting means during the time interval between the leading edge of said energization pulse and the trailing edge of said delay pulse.